(12) United States Patent
Mellara et al.

(10) Patent No.: US 11,130,374 B2
(45) Date of Patent: Sep. 28, 2021

(54) PNEUMATIC TYRE WITH ELEMENTS FOR THE EASY REMOVAL OF ADDITIONAL LAYERS

(71) Applicant: BRIDGESTONE CORPORATION, Tokyo (JP)

(72) Inventors: Beatrice Mellara, Rome (IT); Pasquale Agoretti, Rome (IT); Giuseppe Pezzullo, Rome (IT); Claudio D'Alfonso, Rome (IT); Giampiero Pavoni, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 315 days.

(21) Appl. No.: 16/320,726

(22) PCT Filed: Jul. 27, 2017

(86) PCT No.: PCT/EP2017/069036
§ 371 (c)(1),
(2) Date: Jan. 25, 2019

(87) PCT Pub. No.: WO2018/019947
PCT Pub. Date: Feb. 1, 2018

(65) Prior Publication Data
US 2019/0152275 A1    May 23, 2019

(30) Foreign Application Priority Data
Jul. 28, 2016   (IT) .................. 102016000079491

(51) Int. Cl.
*B60C 19/12*   (2006.01)
*B60C 19/00*   (2006.01)

(52) U.S. Cl.
CPC .......... *B60C 19/122* (2013.01); *B60C 19/002* (2013.01); *B60C 19/125* (2013.01)

(58) Field of Classification Search
CPC ....... B60C 5/002; B60C 19/00; B60C 19/002; B60C 19/12; B60C 19/122; B60C 19/125
See application file for complete search history.

(56) References Cited

U.S. PATENT DOCUMENTS

2003/0201044 A1    10/2003  Schick
2016/0031269 A1*   2/2016   Sakakibara ........... B60C 19/002
                                                    152/450

FOREIGN PATENT DOCUMENTS

DE   102008053506 A1   4/2010
EP     1 433 830 A1    6/2004
(Continued)

OTHER PUBLICATIONS

Machine translation of JP 2003-285376, 2003.*
(Continued)

*Primary Examiner* — Justin R Fischer
(74) *Attorney, Agent, or Firm* — Sughrue Mion, PLLC

(57) ABSTRACT

Pneumatic tyre (1) comprising a carcass ply (11), two ring beads (12), a tread strip (10), a tread belt (15) comprising at least two tread plies (16), an innerliner (2) and an additional functional material layer (4,5) arranged between the innerliner (2) and the inner cavity (17) of the pneumatic tyre (1), wherein between the innerliner (2) and the layer of additional functional material (4,5) a net layer (3) is interposed, which facilitates the removal thereof during disposal at the end-of-life of the pneumatic tyre.

13 Claims, 7 Drawing Sheets

(56) References Cited

FOREIGN PATENT DOCUMENTS

| | | |
|---|---|---|
| EP | 1 777 081 A2 | 4/2007 |
| EP | 2 335 911 A1 | 6/2011 |
| EP | 2505390 * | 10/2012 |
| JP | 2003-285376 * | 10/2003 |
| JP | 2006-341681 A | 12/2006 |
| WO | 2015/111314 A1 | 7/2015 |

OTHER PUBLICATIONS

Written Opinion for PCT/EP2017/069036, dated Oct. 12, 2017.
International Search Report for PCT/EP2017/069036, dated Oct. 12, 2017.
Translation of Communication dated Apr. 7, 2020, from the Japanese Patent Office in Application No. 2019-504049.
Translation of Communication dated Mar. 24, 2020, from The China National Intellectual Property Administration in Application No. 201780045230.1.

* cited by examiner

PNEUMATIC TYRE WITH ELEMENTS FOR THE EASY REMOVAL OF ADDITIONAL LAYERS

This Application is a National Stage of International Application No. PCT/EP2017/069036 filed Jul. 27, 2017, claiming priority based on Italian Patent Application No. 102016000079491 filed Jul. 28, 2016.

TECHNICAL FIELD OF THE INVENTION

The present invention relates to a pneumatic tyre and in particular it refers to a pneumatic tyre comprising a net layer for the easy removal from the inner cavity of the pneumatic tyre of additional functional layers or components such as sealing or sound-absorbing layers.

BACKGROUND

The use of a viscous sealant layer in pneumatic tyres that is generally arranged within the inner cavity of the pneumatic tyre has been known for a long time. In particular, the sealant layer is generally arranged on the central area of the surface of the inner cavity located at the tread band. The purpose of the sealant layer is to surround and adhere to the object that has penetrated the tread and to fill the cavity left by the penetrating object following the possible expulsion thereof, thus, by virtue of instantaneous sealing, preventing any escape of air from the pneumatic tyre.

Also known is the use in pneumatic tyres of a layer of porous sound-absorbing material within the internal cavity of the pneumatic tyre. The layer of porous sound-absorbing material is generally arranged on the central area of the inner cavity surface at the tread band. The purpose of the layer of porous sound-absorbing material is to reduce acoustic pneumatic tyre emissions within the vehicle when the pneumatic tyre is rolling.

In relation to consolidated and standard pneumatic tyre constructions, both of the aforementioned layers can be regarded as "additional" and both are generally applied within the pneumatic tyre cavity in direct contact with the inner impermeable layer of the tire, also known as the "innerliner". Such layers provide a function that is an addition to the standard characteristics of the pneumatic tyre, i.e., sealing in case of puncture and further attenuation of noise emissions; for this reason they are called additional functional layers.

The adhesion of such additional layers to the innerliner is guaranteed by means of the use of adhesive materials, as for example in the case of the sound-absorbing layer wherein, generally, a strip of double-sided adhesive or bi-adhesive material is used, attached beforehand to one side of the strip of sound-absorbing material, or else, by virtue of the adhesive properties of the same viscous sealant layer which adheres directly to the innerliner.

For the correct use of the pneumatic tyre, it is essential that these additional layers adhere securely to the innerliner throughout the entire life of the pneumatic tyre and especially during the operation thereof.

This feature may instead represent a difficulty during the disposal phase of a worn pneumatic tyre at the end-of-life thereof or during a possible repair of the same or during a possible either partial or complete replacement of the additional component.

Given the strong adhesion of the aforementioned additional layers to the innerliner, their removal, either complete, for the differentiated disposal of the various materials, or partial, for a possible repair or replacement thereof, is complicated and can also impair disposal operations of the pneumatic tyre, as well as the replacement and maintenance of the layers or components themselves.

EP1777081 discloses a pneumatic tyre having a noise damper and a method for fixing the damper to the pneumatic tyre wherein the inner surface of the tread portion of the vulcanized pneumatic tyre is buffed, and the noise damper is fixed to the buffed inner surface, using a double-sided adhesive tape.

WO2015111314 discloses a pneumatic tyre having a strip-shaped sound absorber bonded on the inner surface of a region corresponding to a tread part.

EP1433830 discloses a sealant rubber composition which forms a spongy tacky sealant layer and a pneumatic tyre having in the pneumatic tyre main body a tacky sealant layer obtained by heating the rubber composition.

EP2335911 discloses a pneumatic tyre comprising a sulfur cured assembly comprising an outer circumferential rubber tread, a supporting carcass, an inner liner rubber layer inwardly disposed on the supporting carcass, a built-in polymeric sulfur curable thermoplastic diene-based polyurethane (TPU) adhesive layer disposed inwardly of the rubber inner liner layer, and a polyurethane sealant layer adhered to the built-in adhesive layer which provides self-sealing properties to the pneumatic tyre.

SUMMARY

The technical problem underlying the present invention is therefore to provide a pneumatic tyre that will optimize the partial or complete removal of additional functional layers or components applied within the inner cavity of the pneumatic tyre, such as sealant layers or layers of sound-absorbing material, during the pneumatic, tyre end-of-life disposal procedure or during a possible repair of the pneumatic tyre.

The problem posed is solved by means of a pneumatic tyre according to claim 1.

Preferred features of the invention are the subject of the dependent claims.

The pneumatic tyre according to the present invention comprises at least one net layer interposed, within the inner cavity of the pneumatic tyre, between the innerliner and an additional functional material layer, such as for example a layer of sealant material or a layer of porous sound-absorbing material. The at least one net layer comprises a plurality of meshes.

It is understood that the term "innerliner" refers to the radially innermost layer of the pneumatic tyre construction within the cavity that guarantees the pneumatic tyre impermeability to air and the consequent maintaining of the inflation pressure being this either a single specific component or, in the case that this layer is possibly lacking, the rubber compound layer covering the carcass plies, commonly called "skim". In this latter case, the impermeability of the inner cavity of the pneumatic tyre is guaranteed by the "skim" of at least one carcass ply, preferably the radially inner ply exposed to the inner cavity of the pneumatic tyre.

The properties of the net layer allow for the removal of the additional layers to be removed at the end-of-life of the pneumatic tyre insofar as it represents a layer interposed and removable between the innerliner and the additional functional layer or component.

Moreover, by virtue of the mesh structure thereof, the net layer does not interfere either with the adhesion to the innerliner of the additional layers or the correct functionality thereof during normal pneumatic tyre operation, nor the functionality of the sealant material in the case of a puncture.

The present invention comprises both embodiments wherein the aforementioned net layer does not have adhesive properties on the respective sides thereof, and embodiments wherein one or both sides of the net layer have adhesive properties.

In the embodiments of the present invention, the additional functional layers, such as the sealant layer or the layer of sound-absorbing material, may either adhere directly to the innerliner through the meshes of the net layer or adhere to the interweaving of the net (i.e. the outer perimeter of the meshes consisting of mass) which, in turn, adheres to the innerliner by means of a suitable adhesive layer, or else also by means of a combination of the above mentioned embodiments, thus adhering to both the innerliner through the meshes and to the intersections of the net (i.e. the outer perimeter of the meshes consisting of mass) which in turn adheres to the innerliner.

In other embodiments of the present invention, the physical properties of the surface of the net layer can be such that the additional functional materials do not by any means adhere thereto.

BRIEF DESCRIPTION OF THE FIGURES

Reference will be made to the figures of the accompanying drawings, wherein.

DETAILED DESCRIPTION OF PREFERRED EMBODIMENTS

Figure 1:
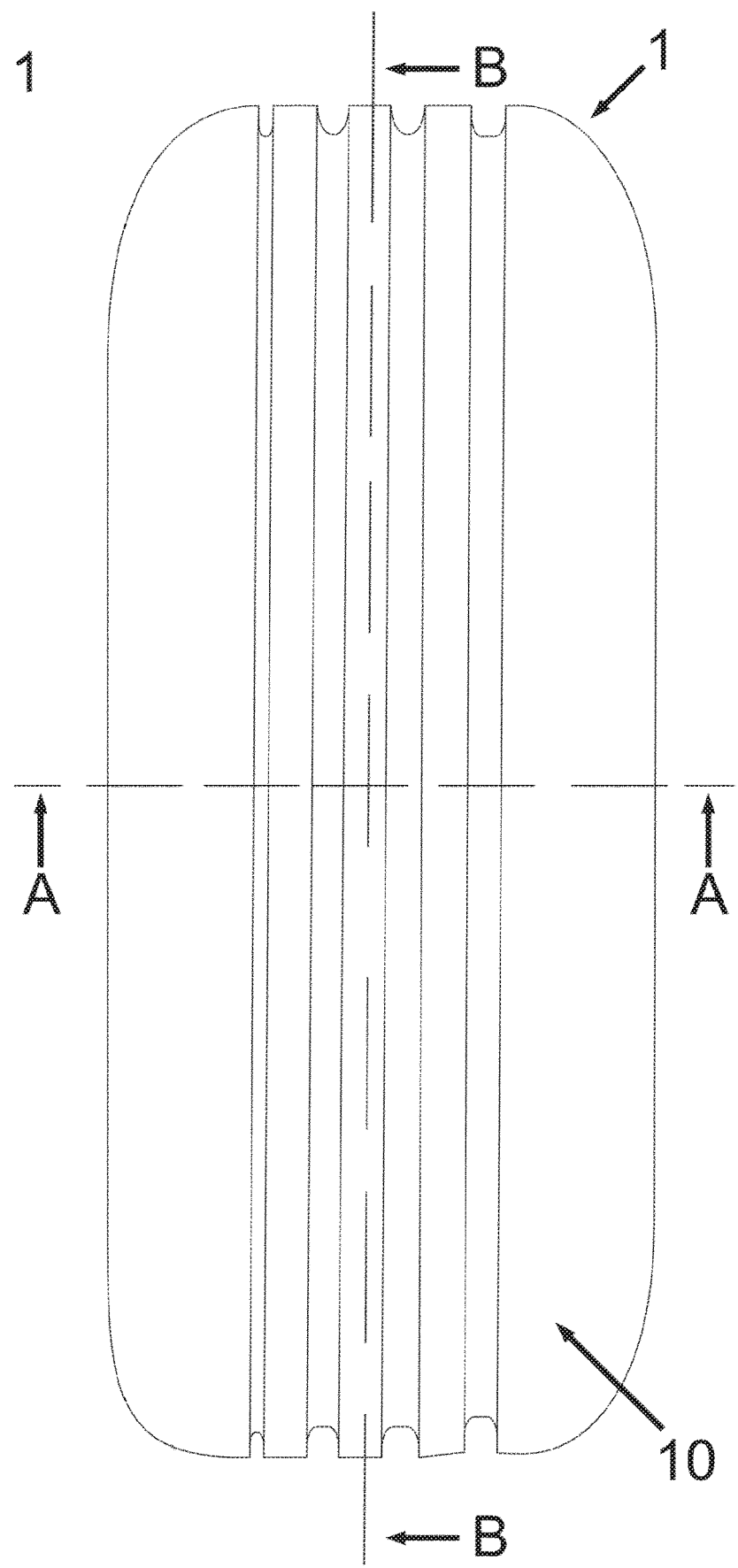
FIG. 1 shows an exemplary front view of a pneumatic tyre.

FIG. 1 shows in an exemplary manner a pneumatic tyre 1 comprising a tread 10.

Consistent with the consolidated terminology in the field, in the present context the "equatorial plane" of a pneumatic tyre is defined as the plane orthogonal to the rotational axis of the pneumatic tyre and passing through the axial center of the pneumatic tyre.

Figure 2:
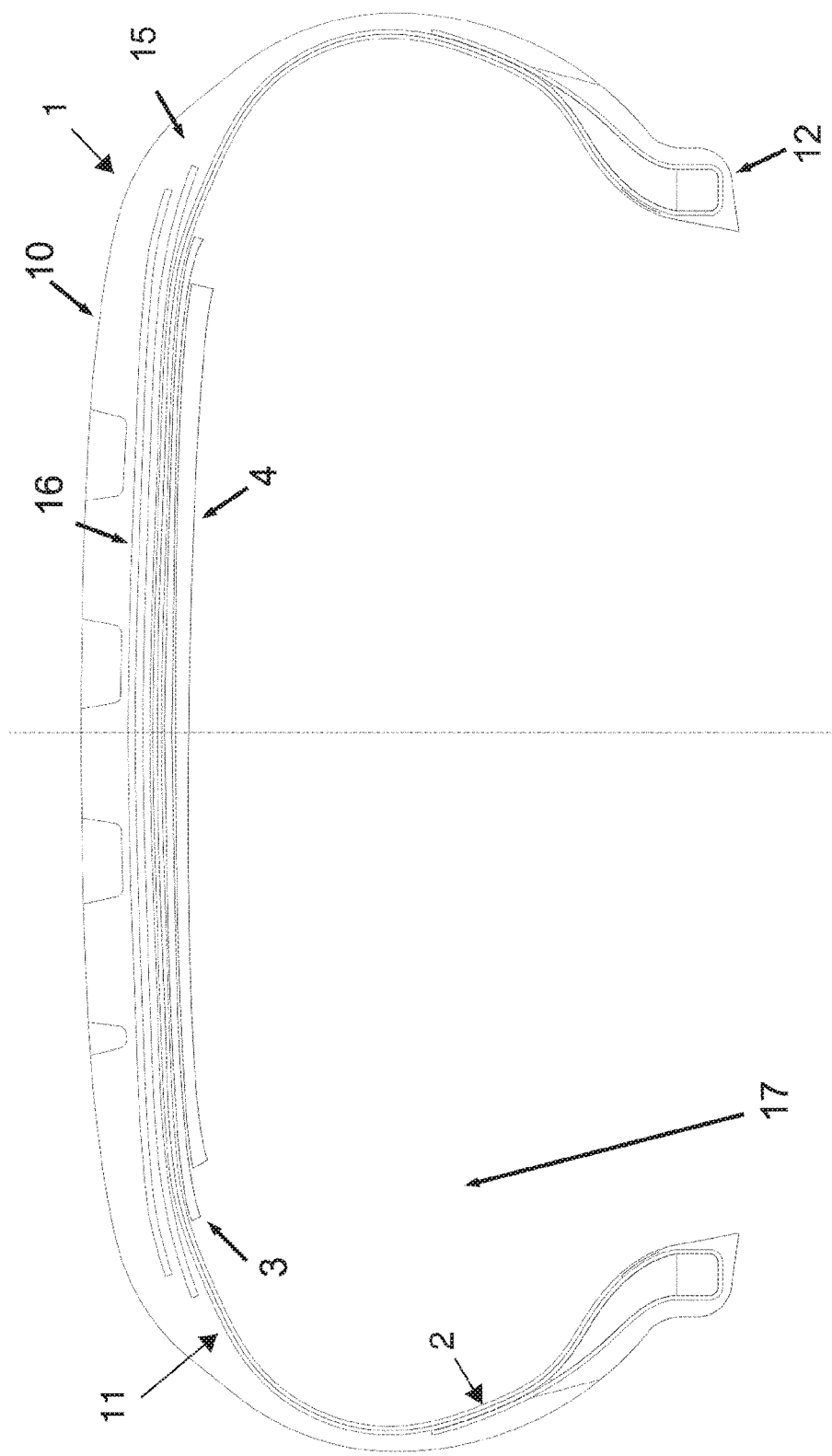
FIG. 2 shows a section view of the pneumatic tyre of FIG. 1, taken along the plane A-A of the latter figure according to a first preferred embodiment of the following invention.

FIG. 2 shows the section view of the pneumatic tyre 1 comprising an innerliner 2, at least one carcass ply 11, two ring beads 12 and a tread strip 10; even though not explicitly depicted, it is understood that the innerliner 2 may also be the "skim" radially internal to the carcass ply 11 in the absence of a specific rubber layer component. Between the tread strip 10 and the carcass ply 11, a tread belt 15 is interposed, comprising at least two tread plies 16. The innerliner 2 is interposed between the carcass ply 11 and the interior of the cavity 17 of the pneumatic tyre and guarantees the impermeability thereof. FIG. 2 also shows a net layer 3 interposed between the innerliner 2 and an additional functional layer 4, such as for example a layer of porous sound-absorbing material arranged within the cavity 17.

Figure 3:
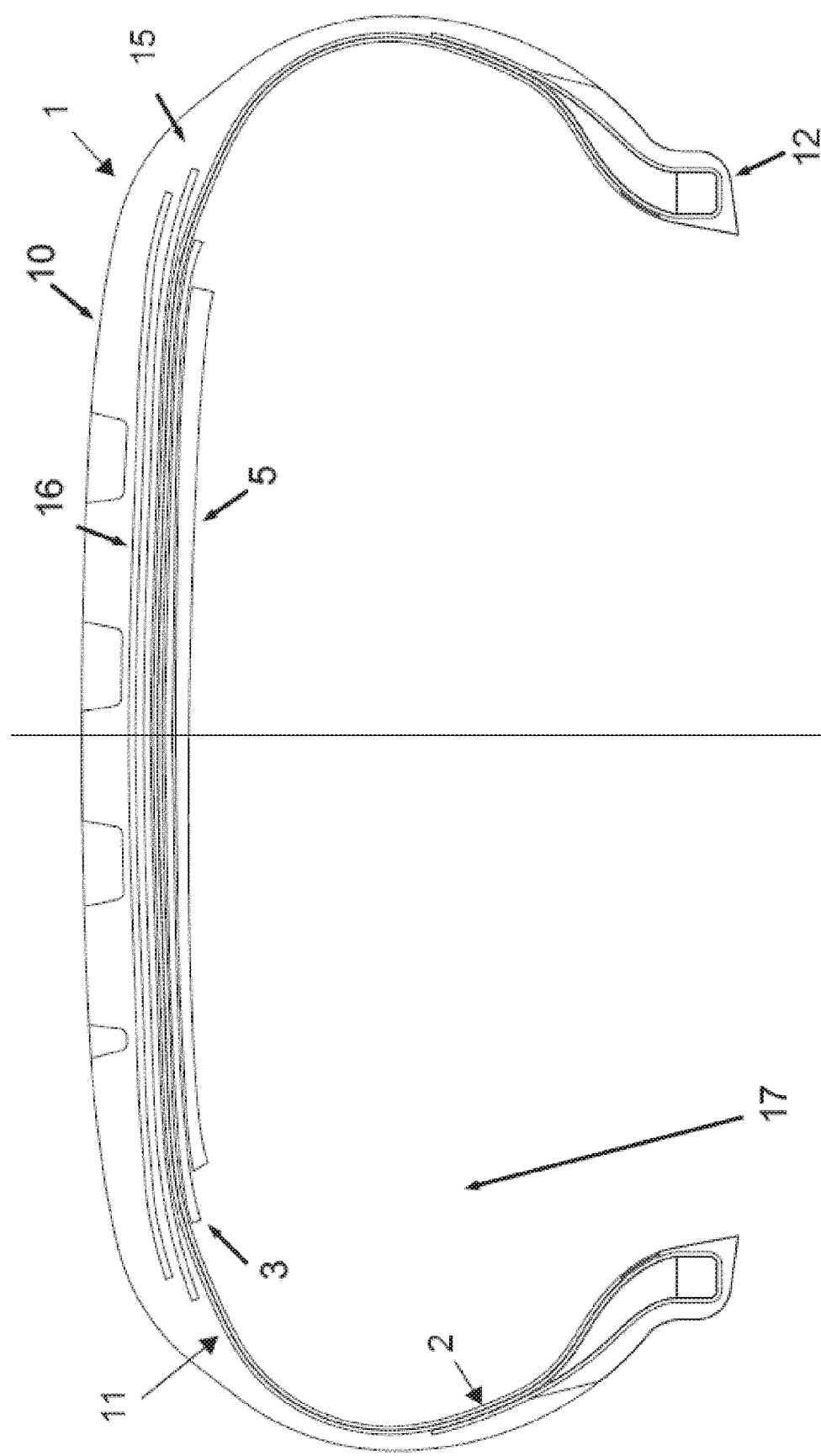
FIG. 3 shows a section view of the pneumatic tyre of FIG. 1, taken along the plane A-A of the latter figure according to a second preferred embodiment of the following invention.

FIG. 3 shows the same section view of the pneumatic tyre 1, wherein however, a net layer 3 is interposed between the innerliner 2 and an additional functional layer 5, such as a layer of viscous sealant material.

The net layer 3 and the additional functional layer 4,5 are located in correspondence with the tread strip 10 and preferably in correspondence with the two tread plies 16.

The net layer 3 in a preferred embodiment is applied to the inside of the cavity 17 of the pneumatic tyre 1 following the vulcanization of the same pneumatic tyre. In other embodiments the net layer 3 can be applied prior to vulcanization during the pneumatic tyre assembly phase and vulcanized together with the same pneumatic tyre.

In a preferred embodiment, the net layer 3 has one or both sides with adhesive properties. Such a characteristic facilitates the application and adhesion of said net layer 3 to the innerliner 2 following the vulcanization of the pneumatic tyre.

The adhesive characteristics of the second side of the net layer 3 (the side opposite the first and in contact with the innerliner 2) facilitate the application of an additional functional layer 4,5 upon it, such as for example a strip of sound-absorbing material 4 or a viscous sealant layer 5.

In another embodiment the net layer 3 does not have adhesive properties on both sides. In this case, in order to facilitate the adhesion thereof to the innerliner 2, a layer of adhesive material, for example a liquid adhesive material applied by means of a spraying procedure, may previously be applied to the innerliner.

In a further embodiment, the net layer 3 is previously assembled to the additional functional layer 4,5 and subsequently applied to the innerliner 2.

The net layer 3, before the application thereof onto the pneumatic tyre 1, presents itself as a strip of net material of a length equal to or greater than the inner circumference of the pneumatic tyre in proximity to the innerliner 2 upon which it will be applied. This strip of net material may have an axial width equal to or greater than the layer of additional material 4,5 to which it will be interposed.

In the case wherein the strip of net material 3 has an axial width greater than the additional layer 4,5 to which it will be interposed, the result will be one or more net layer 3 flaps that will extend beyond the axial end(s) of the additional material 4,5. These flaps support the removal, even partial, of the layer of additional material insofar as they allow for the removal of the additional material 4,5 in an axial manner and for a confined sector of the circumference of the pneumatic tyre.

The net layer 3 preferably has meshes 6 in the shape of a polygon, such as for example hexagonal, pentagonal, rhomboidal, rectangular, square or triangular. Alternatively, the net layer 3 has circular or elliptical shaped meshes 6.

The area within the single mesh 6 of any shape is denoted by M.

In a preferred embodiment, the area M of the single mesh 6 is between 0.25 mm$^2$ and 2500 mm$^2$. Such a range of areas of the single mesh 6 allows for the use thereof for various additional functional materials, such as for example, but not exclusively, those described thus far.

Figure 4:
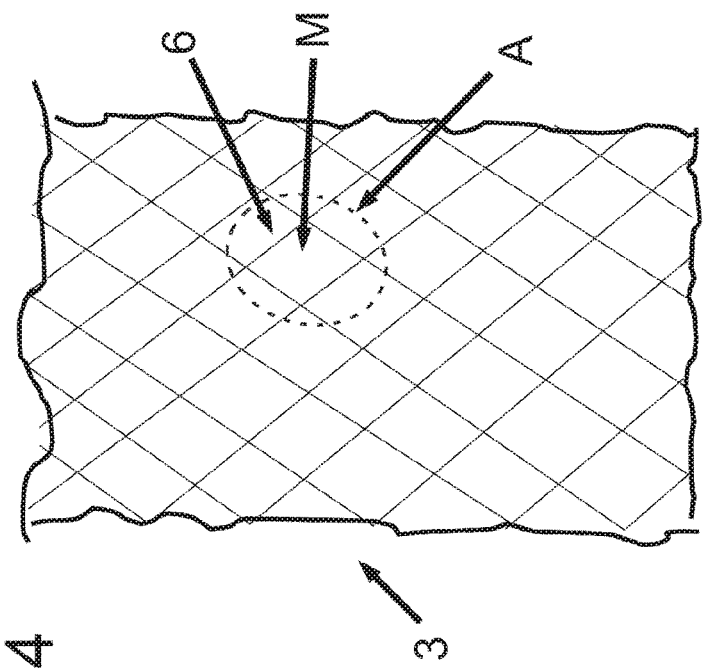
FIG. 4 shows a schematic representation of the net layer according to a preferred embodiment of the following invention.
Figure 6:
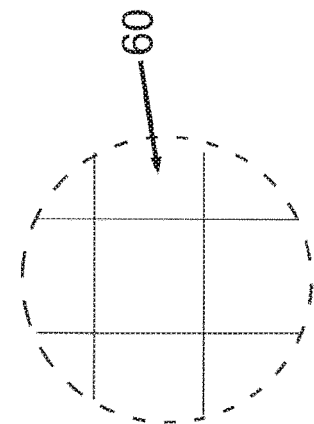
FIG. 6 shows a schematic representation of the net layer according to another preferred embodiment of the following invention.
Figure 7:
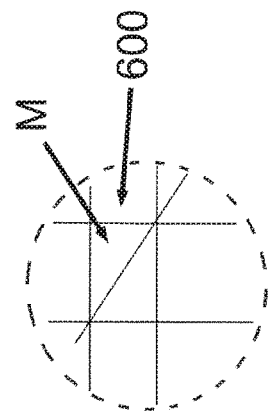
FIG. 7 shows an enlarged schematic representation of a mesh of the net layer in FIG. 6.
Figure 8:
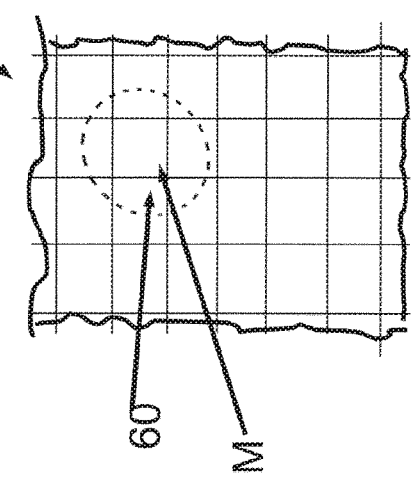
FIG. 8 shows a schematic representation of the net layer according to a further preferred embodiment of the following invention.
Figure 9:
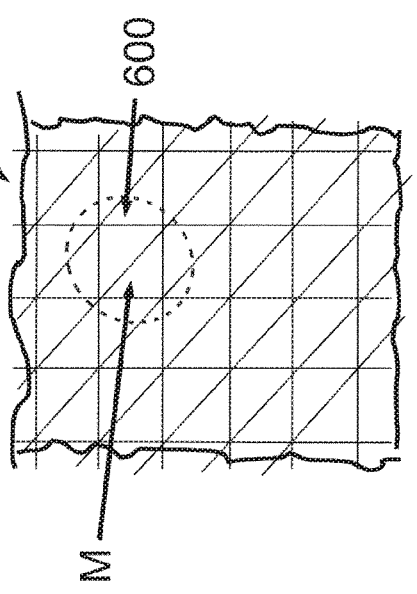
FIG. 9 shows an enlarged schematic representation of a mesh of the net layer in FIG. 8.
Figure 10:
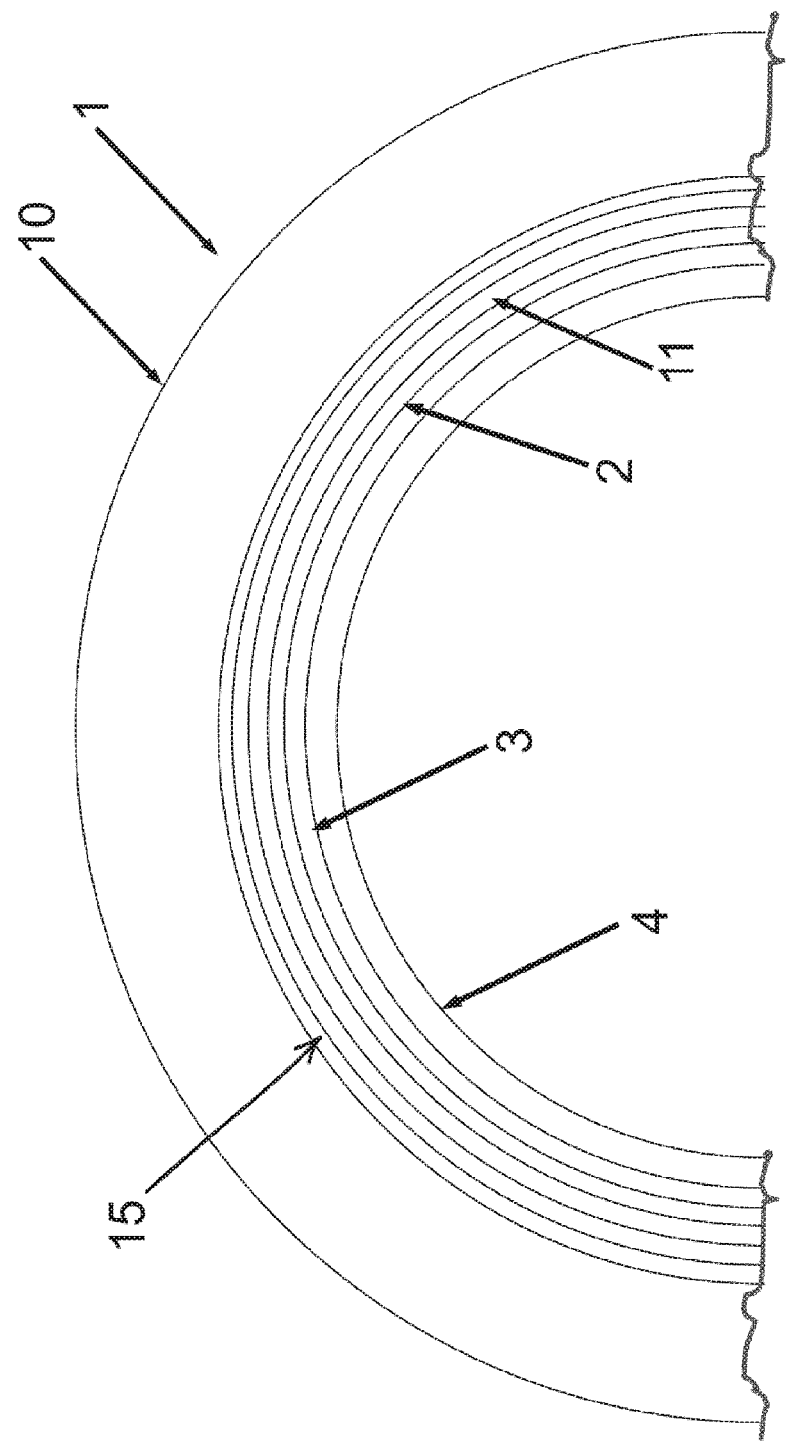
FIG. 10 shows a schematic section view of the pneumatic tyre of FIG. 1, taken along the plane B-B of the latter figure, wherein the additional layer and the net layer are represented in the positions thereof during the normal operation of the pneumatic tyre.

FIG. 4 shows the strip of net layer 3 that preferably has meshes 6 of a rhomboidal shape.

Figure 5:
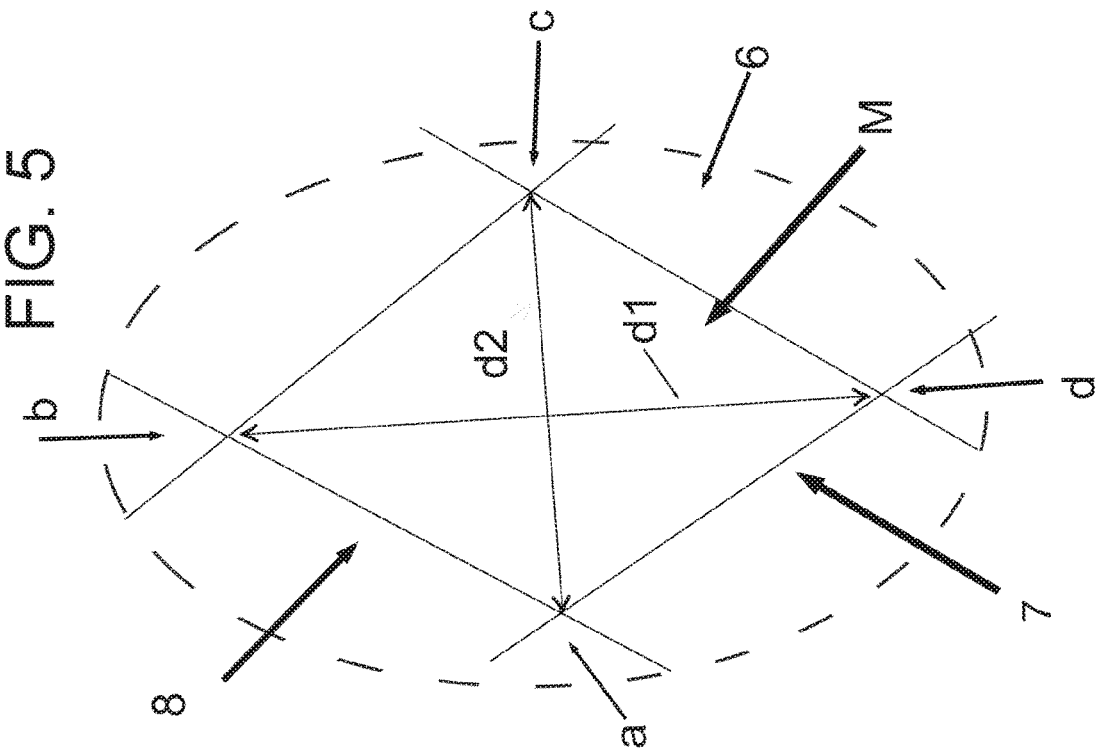
FIG. 5 shows an enlarged schematic representation of a mesh of the net layer in FIG. 4.

FIG. 5 illustrates the detail of a mesh 6 of the net strip 3 of FIG. 4.

The sides of the rhombus that constitute the mesh 6 comprise a first side 7 and a second side 8. The shape of the rhombus provides for the presence of two first sides 7 and two second sides 8. Within the mesh 6, the ends where the first sides 7 and the second sides 8 intersect constitute the nodes a, b, c, d. The imaginary diagonal d1 connects the points b and d, while the imaginary diagonal d2 connects the points a and c.

In another preferred embodiment, the area M of the single mesh 6 is between 0.25 mm$^2$ and 25 mm$^2$, preferably between 0.56 mm$^2$ and 15 mm$^2$, more preferably the area M of the single mesh 6 is approximately 10 mm$^2$ or equivalent to 10 mm$^2$.

A net layer with meshes of such dimensions is preferable to be interposed between the innerliner 2 and a layer of sealant material 5. The area of the meshes is in fact such that, in ensuring the flow of the sealant material within a possible hole left by the perforating object, the net offers sufficient resistance in the act of being removed to be able to detach the sealant layer without it flowing through the meshes, and, thus, remaining attached to the innerliner 2.

In another preferred embodiment, the area M of the single mesh 6 is between 25 mm$^2$ and 2500 mm$^2$, preferably between 50 mm$^2$ and 1500 mm$^2$, more preferably the area M of the single mesh 6 is approximately 100 mm$^2$ or equivalent to 100 mm$^2$.

A net layer with meshes of such dimensions is preferable to be interposed between the innerliner 2 and a layer of porous sound-absorbing material 4. The area of the meshes is in fact such that the net offers sufficient resistance in the act of being removed to be able to detach the layer of porous sound-absorbing material 4 without it remaining attached to the innerliner 2.

In a preferred embodiment, the first side 7 and the second side 8 of the single mesh 6 have a total length of between 0.5 mm and 10 mm, preferably a length of about 5 mm or equivalent to 5 mm.

In another preferred embodiment, the first side 7 and the second side 8 of the single mesh 6 have a total length of between 5 mm and 20 mm, preferably a length of about 10 mm or equivalent to 10 mm.

In one embodiment, the first sides 7 and second sides 8 that intersect at the ends of the diagonals d1 and d2 respectively have different lengths at the nodes along a first diagonal and an equal length at the nodes along a second diagonal.

In another embodiment, the first sides 7 and second sides 8 that intersect at the ends of the diagonals d1 and d2 have different lengths, both at the nodes along a first diagonal and at the nodes of a second diagonal.

Preferably, the two diagonals d1 and d2 have different lengths.

Preferably, the diagonal d1 with the longer length is oriented along the circumferential direction of rotation of the pneumatic tyre, while the diagonal d2 with the shorter length is oriented in an axial manner along the pneumatic tyre.

In a second embodiment of the present invention, the meshes 60 of the net of the net layer 3 have a square shape. The pairs of first sides 7 and second sides 8 therefore all have the almost same or equal lengths.

In a third embodiment of the present invention, the meshes 600 of the net of the net layer 3 have a triangular shape. This form has two first sides 7 of equal length and a second side 8 of a greater or lesser length.

In other embodiments of the present invention, the meshes 6 of the net of the net layer 3 have either a pentagonal or hexagonal shape.

In each of the forms of the aforementioned embodiments, the material of the net layer 3 is a polymeric material of synthetic or natural origin, preferably included within the group comprised of polyolefins, such as for example polyethylene (PE), polypropylene (PP), of polyesters, such as for example polyethylene terephthalate (PET), polyamides, such as nylon for example, of poliaramides, such as Kevlar® and natural fibers, such as for example cellulose and Rayon.

In each of the aforementioned embodiments, the area M of the openings of the meshes 6, 60, 600 of the net layer 3 allows for the direct adhesion of the additional material, such as a layer of porous sound-absorbing material 4 or viscous sealant material 5, to the innerliner without constituting an obstacle or barrier. The area of the polymeric material of the net itself is in fact less than the overall area of the meshes M, which is understood to be an "empty" area.

The net layer 3 can therefore be considered to be an inert layer with respect to the operation of the pneumatic tyre.

The applicant has carried out comparative tests according to the ISO10534-2 standard for evaluating the acoustic absorption coefficient of pneumatic tyres with a porous sound-absorbing material comprising and not comprising the net layer 3.

The results are given in Table 1 below.

TABLE 1

|  | Pneumatic tyre without a net layer | Pneumatic tyre with a net layer |
|---|---|---|
| Net layer material | — | Nylon |
| Shape of the mesh of the net layer | — | rhomboidal |
| Area M of the single mesh of the net layer | — | 65 mm$^2$ |
| Thickness of the removed sound-absorbing material | 3 cm | 3 cm |
| Percentage of the removed sound-absorbing material | — | 100 |
| Acoustic absorption coefficient | 100 | 100 |
| Adhesion to the innerliner | 100 | 100 |

As can be seen from the results of Table 1, the net layer material has no impact on the acoustic characteristics of the porous sound-absorbing material.

The applicant also carried out comparative tests in order to evaluate the degree of pressure tightness of pneumatic tyres with viscous sealant material comprising and not comprising the net layer 3. The results are given in Table 2 below:

TABLE 2

|  | Pneumatic tyre without a net layer | Pneumatic tyre with a net layer | Pneumatic tyre with a net layer | Pneumatic tyre with a net layer |
| --- | --- | --- | --- | --- |
| Sealant layer thickness | 4 mm | 4 mm | 4 mm | 4 mm |
| Net layer material | — | PP | PP | PP |
| Area of the mesh of the net layer | — | 1 mm$^2$ | 4 mm$^2$ | 9 mm$^2$ |
| Percentage of removed sealant material | 0 | 99 | 97 | 96 |
| Inflation pressure percentage after 24 hours | 100 | 70 | 95 | 100 |

The test for which the results are listed in Table 2 consists in measuring the pressure after 24 hours of a pneumatic tyre comprising a layer of sealant material with and without a net layer 3, wherein a nail had previously been inserted in order to simulate a puncture.

A "percentage of inflation pressure after 24 hours" equal to "100" is equivalent to the total impermeability of the inner cavity of the pneumatic tyre.

In each of the aforementioned embodiments, the net layer 3 facilitates the removal of the additional layer applied to the inside of the cavity, whether it be a layer of porous sound-absorbing material 4 or a layer of viscous sealant material 5.

Figure 11:
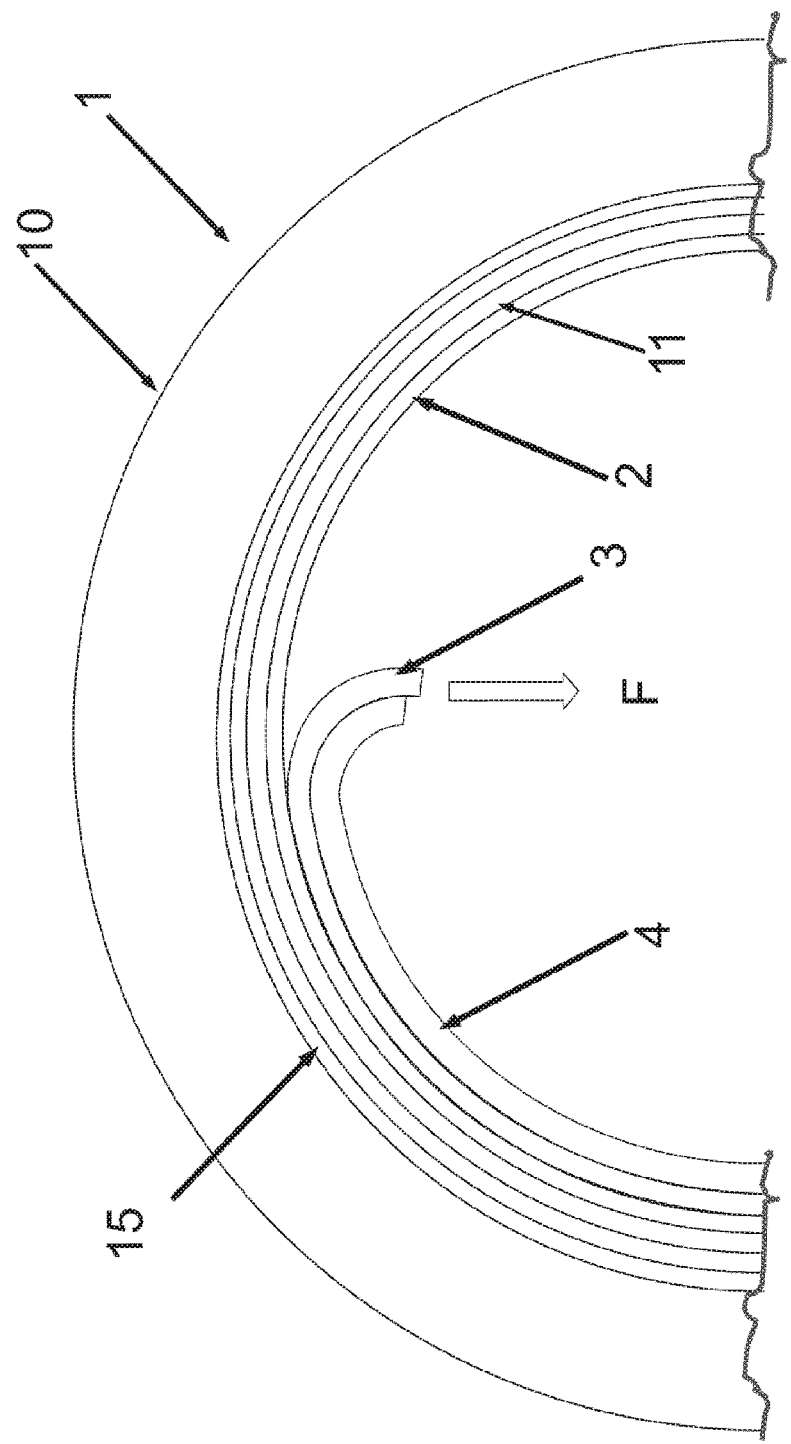
FIG. 11 shows a schematic section view of the pneumatic tyre of FIG. 1, taken along the plane B-B of the latter, wherein the additional layer and the net layer are represented during the removal thereof from the innerliner.

FIG. 11 shows a schematic representation of the removal of the additional functional material along the circumference of the pneumatic tyre by virtue of the net layer 3.

In not adhering to the innerliner 2, or adhering to it in a lesser manner than the additional functional layers 4,5, the net layer 3 is more easily removed by pulling it away from the innerliner, as represented by the arrow F.

By virtue of the its interposition between the innerliner 2 and the additional functional material 4,5, the removal of the net layer 3 will also facilitate the removal of the additional material 4,5 itself.

During the pneumatic tyre disposal phase, it will be sufficient, for example, to apply a cut to the additional material 4,5 in order to let the net layer 3 emerge such as to be able to pull it away.

Alternatively, it is provided the application of a strip of net layer 3 that is longer than the circumference of the pneumatic tyre, representing a tear-off flap emerging from the additional functional layer 4,5.

In another alternative, the net layer is axially wider than the additional functional layer 4,5, such as to have, at the axial ends, flaps that enable gripping the net material 3 in order to be able to pull it away.

The invention has heretofore been described with reference to preferred embodiments. It is understood that there may be other embodiments that refer to the same inventive concept and that fall within the scope of the following claims.

The invention claimed is:

1. A pneumatic tyre (1) comprising a carcass ply (11), two beads (12), a tread strip (10), a tread belt (15) comprising at least two tread plies (16), an innerliner (2) and an additional functional material layer (4,5) arranged between the innerliner (2) and the inner cavity (17) of the pneumatic tyre (1) characterized in that a net layer (3) comprising a plurality of meshes (6, 60, 600) is interposed between the innerliner (2) and the additional functional material layer (4,5), wherein the material of the net layer (3) is a synthetic or natural polymeric material, and wherein the additional functional material layer (5) is a layer of viscous sealant material.

2. The pneumatic tyre (1) according to claim 1, wherein the area (M) of a single mesh (6, 60, 600) of the net layer (3) is between 0.25 mm$^2$ and 2500 mm$^2$.

3. The pneumatic tyre (1) according to claim 1, wherein the material of the net layer (3) is comprised in the group of polyolefins, polyesters, polyamides, poliaramides and natural fibers.

4. The pneumatic tyre (1) according to claim 3, wherein the material of the net layer (3) is comprised in the group of polyethylene (PE), polypropylene (PP), polyethylene terephthalate (PET), nylon, Kevlar®, cellulose and Rayon.

5. The pneumatic tyre (1) according to claim 1, wherein the shape of the single mesh (60, 6, 600) of the net layer (3) is polygonal, preferably hexagonal, pentagonal, rhomboidal, triangular, rectangular or square.

6. The pneumatic tyre (1) according to claim 5, wherein the shape of the single mesh (6) of the net layer (3) is rhomboidal and the diagonal (d1) with the greater length of the mesh (6) is oriented along the circumferential rolling direction of the pneumatic tyre.

7. The pneumatic tyre (1) according to claim 1, further comprising additional functional material layer (4) of porous sound-absorbing material.

8. The pneumatic tyre (1) according to claim 7, wherein the area (M) of the single mesh (6, 60, 600) of the net layer (3) is between 25 mm$^2$ and 2500 mm$^2$.

9. The pneumatic tyre (1) according to claim 8, wherein the area (M) of the single mesh (6, 60, 600) of the net layer (3) is between 50 mm$^2$ and 1500 mm$^2$.

10. The pneumatic tyre (1) according to claim 1, wherein the area (M) of the single mesh (6, 60, 600) of the net layer (3) is between 0.25 mm$^2$ and 25 mm$^2$.

11. The pneumatic tyre (1) according to claim 10, wherein the area (M) of the single mesh (6, 60, 600) of the net layer (3) is between 0.56 mm$^2$ and 15 mm$^2$.

12. The pneumatic tyre (1) according to claim 1 wherein one or both sides of the net layer (3) have adhesive properties.

13. The pneumatic tyre (1) according to claim 1 wherein the additional functional material layer (4,5) adheres to the innerliner (2) though the area (M) of the meshes (6, 60, 600) of the net layer (3).

* * * * *